March 9, 1954  A. C. HUMMEL  2,671,659
METERING DEVICE FOR TAPE DISPENSERS
Filed Jan. 25, 1951  2 Sheets-Sheet 1

Inventor
AUGUST C. HUMMEL,
BY Allen + Allen
Attorneys.

March 9, 1954 — A. C. HUMMEL — 2,671,659
METERING DEVICE FOR TAPE DISPENSERS
Filed Jan. 25, 1951 — 2 Sheets-Sheet 2

Inventor.
AUGUST C. HUMMEL,
By Allen & Allen
Attorneys.

Patented Mar. 9, 1954

2,671,659

UNITED STATES PATENT OFFICE 2,671,659

METERING DEVICE FOR TAPE DISPENSERS

August C. Hummel, Cincinnati, Ohio

Application January 25, 1951, Serial No. 207,695

10 Claims. (Cl. 271—2.4)

My invention relates to a device which meters or measures the length of tape dispensed by a tape dispenser of the type wherein a shaft is rotated in proportion to the length of tape which is dispensed.

In shipping departments and other places wherein a great amount of packing is done, there is usually provided a gummed tape dispenser which dispenses moistened gummed tape of a length dependent upon the movement of the dispensing handle.

The usual type of manual dispenser carries an arm which is mounted upon the axle to which the handle is keyed and which runs over a scale during the movement of the handle indicating to the operator where to stop movement of the handle in order to dispense a length of tape shown by the indicia indicated by the arm.

In dispensers of this type, as is apparent, the length of tape is determined by the angular position of the operating arm at its limit of forward movement, which in turn is controlled by the operator. Operators in a shipping department normally work very rapidly and hence invariably overrun their reading of the arm pointer sweeping over the indicia which results in cutting off a length of tape usually greatly in excess of the amount required. During the course of a day a great deal of tape is wasted by this incorrect dispensing which results in an appreciable waste of money over a relatively short length of time. Likewise, slowing up the operation to secure lengths closer to those which are predetermined, results in a considerable loss of time and, therefore, money.

This waste is greatest where the operator dispenses tape of different lengths in succession and applies generally to most shipping and packing operations. That is, where he follows a length of twenty inches by a length of twenty-six inches, and possibly then a length of ten inches. Where the operator is doing some production work which requires numerous strips of tape of the same length, the machine is usually provided with a movable abutment which may be placed in the path of the handle and thus stop the movement of the handle and the rotation of the axle at the same predetermined place at all times. However, when different lengths are dispensed successively, such an abutment is not used.

It is an object of my invention to provide a metering device which is operated by the rotation of a shaft of the dispenser and which may be manually set by the operator before the dispensing handle is moved to insure the stopping of the handle at a predetermined position and thus dispensing at high speed a predetermined length of tape each time the handle is operated.

It is a further object of my invention to provide a device as described above which becomes inoperative just as soon as the predetermined length of tape has been dispensed and the handle returns to home position.

A further object of my invention is to provide a metering means as described above which is easily and readily attachable to any dispensing device for dispensing a tape or the like wherein the length of tape dispensed is determined by the degree of rotation of a rotating axle.

It is a further object of my invention to provide a metering device as described above which is operated by manually depressible buttons or keys which carry indicia indicating the amount of tape which will be dispensed upon the depression of said key.

A further object of my invention is to provide a metering device for a dispenser which is very rugged in construction, positive in operation, but relatively inexpensive to manufacture and sell and quite simple to maintain.

While in the drawings and description which follows I have shown my metering device attached to a specific type of hand operated gum tape dispenser, it is to be understood that I do not intend to limit myself to such a dispenser, since my device may be used with any type of dispenser or feeder wherein the length being fed or dispensed is in proportion to the degree of rotation of some rotating shaft within the mechanism of the dispenser itself.

These and other objects of my invention which will be set forth hereinafter or will be apparent to one skilled in the art upon reading these specifications, I accomplish by that certain construction and arrangement of parts of which I shall now describe an exemplary embodiment. Reference is now made to the drawings which form a part thereof and in which.

Briefly, in the practice of my invention, I provide an arm which is adapted to be attached to a shaft in a tape dispenser which has a degree of rotation proportional to the length of the tape dispensed. On the end of this arm, I provide an abutment which sweeps through a curved path as the shaft to which it is attached is rotated during the dispensing movement.

Adjacent the path of the abutment carried by the arm, I provide a framework or casting which carries a series of buttons or keys which in turn have pins which are projected into the path of the abutment when the button or key is depressed. The keys are arranged circumferentially along the path of the abutment and are positioned so that their pins when depressed will stop the abutment and the arm at a predetermined position which is determined by the length of the tape dispensed by the degree of rotation of the shaft, and the key is so labeled.

The pins which are terminated by the keys include a latch so that when a key is depressed so the pin will be in the path of the abutment, it is latched into place and maintains that position. However, the latch is so arranged that when it is contacted by the abutment on the arm end, it is released. The pins terminate in a shoulder which catches on a projection of the abutment after the latch is released and which prevents their return to their non-operative position. When the shaft on which the arm is mounted is reversed, the abutment leaves the shoulder on the pin end and permits the pin to return to its non-operative position by means of a spring incorporated in the key or button.

From the above, it is apparent that when a desired length of tape is to be dispensed, it is only necessary to depress the key or button carrying the indicia indicating the length to be dispensed. The key, once depressed, remains depressed with its pin in the path of the abutment carried by the arm on the shaft.

As the shaft is rotated in the dispensing action, the degree of rotation is determined and stopped by the abutment on the arm contacting the pin of the depressed key. The latch is thrown but the key is still held in operative position by its projecting shoulder. When the operation is returned to its home position by reversing the rotation of the shaft, the pin is released and returns to inoperative position. Hence, the length of tape shown by the indicia on the button is dispensed and the key returned to non-operative position on each operation of the dispenser. When it is desired to dispense a second length of tape, another button is depressed selectively depending upon the length desired.

By this means, the exact length of the tape which is desired is dispensed and the proper degree of rotation of the shaft to dispense this amount is insured, irrespective of the speed of the operator, since it is the projecting pin in the path of the abutment which determines the degree of rotation, and not the visual inspection of the operator.

Figure 1:
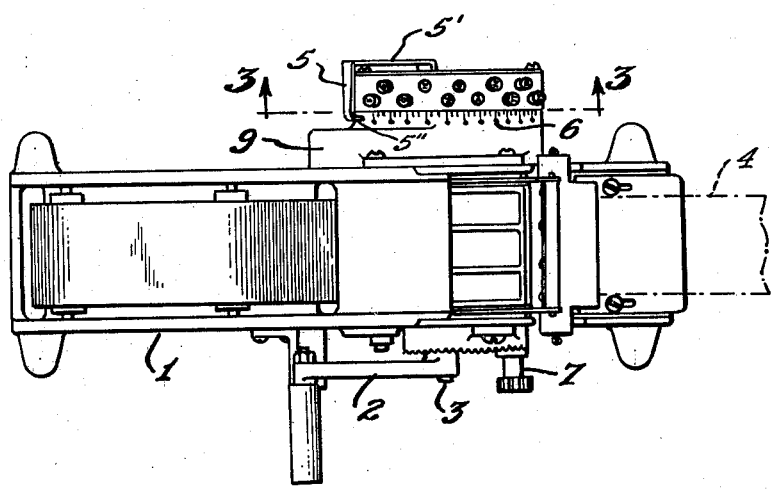
Figure 1 is a plan view of a tape dispenser in which my metering device is incorporated.
Figure 2:
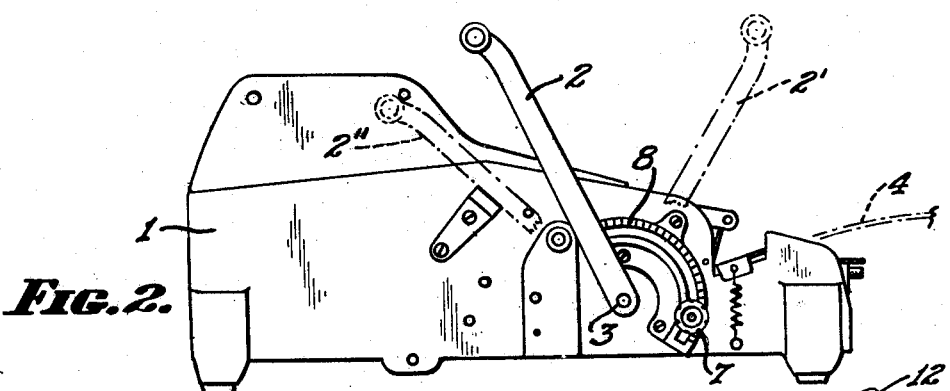
Figure 2 is a side elevation of a dispenser shown in Figure 1.
Figures 3, 4:
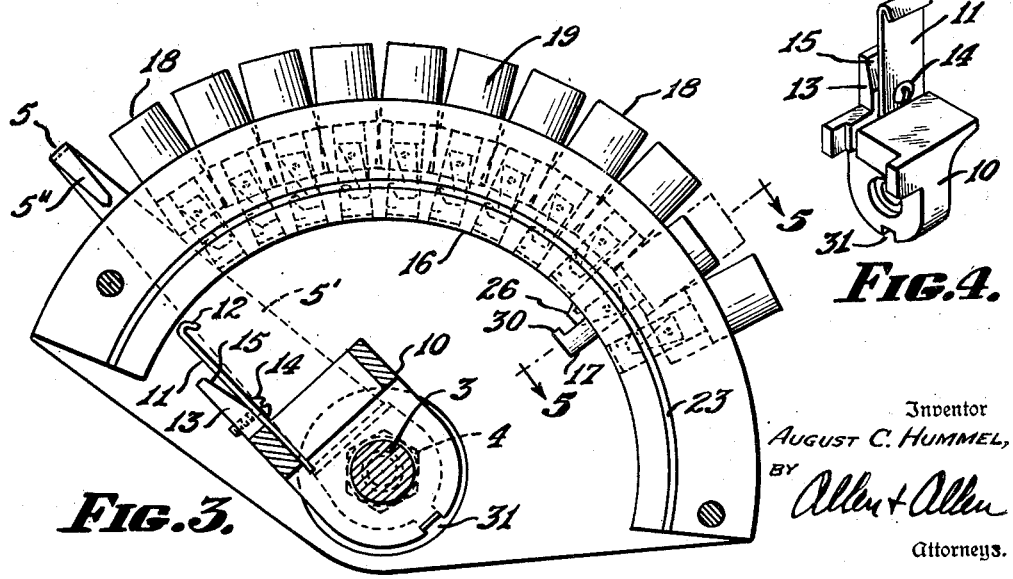
Figure 3 is a cross section of my metering mechanism taken on the section line of 3—3 of Figure 1.
Figure 4 is a perspective view of the abutment arm used in my metering device.
Figures 5, 6, 7:
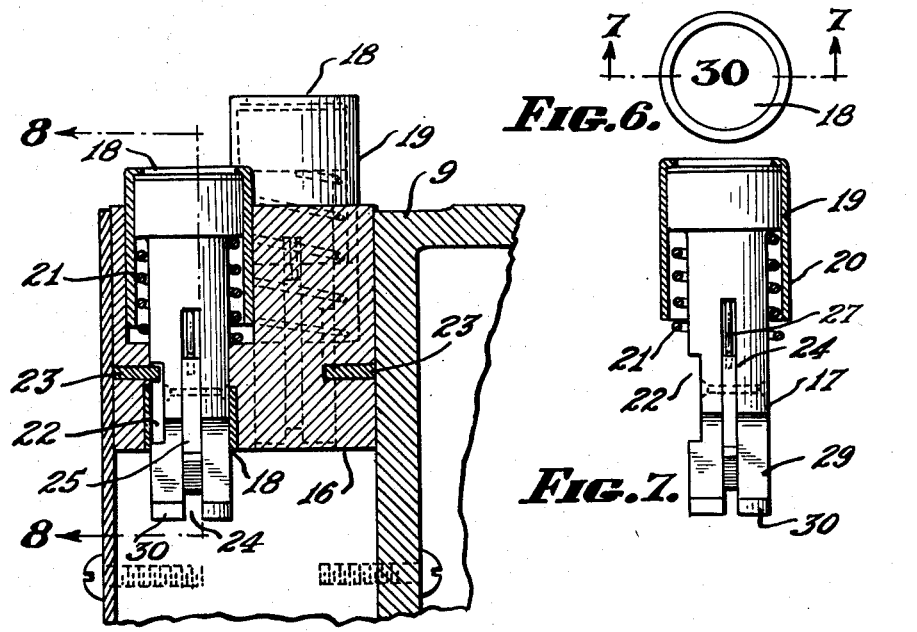
Figure 5 is a cross section of a portion of my metering device showing the buttons or keys and taken on the section line 5—5 of Figure 3.
Figure 6 is a plan view of a typical key or button used in my metering device.
Figure 7 is a cross section of a typical key or button taken on the section line 7—7 of Figure 6.

Referring to the drawings, Figures 1 and 2 show a manually operated gummed tape dispenser generally shown at 1. The tape is dispensed by movement of the arm 2 which is keyed to a shaft 3. The length of the tape dispensed is determined by the angular rotation of the shaft 3, which in turn is controlled by the extent of movement of the handle 2.

As an example, in Figure 2, if the arm is moved to position 2', a predetermined length of tape 4 is dispensed, while if it is only moved from the home position 2'' to the position 2, a shorter length of tape 4 will be dispensed.

Ordinarily, there is an indicator mounted on the shaft 3 similar to the indicator 5 which moves over a scale 6 calibrated in accordance with the length of the tape dispensed by the movement of the arm 2. In order to dispense a predetermined length of tape, the operator moves the handle 2 until the indicator 5 is positioned opposite the selected indicia on the dial 6 and then the handle 2 is permitted to return to its home position 2''. In the event a large number of strips of tape of the same length is desired, the hand nut 7 is loosened and moved along the arc 8 and again locked in position to limit the movement of the handle 2. As is obvious, the correct positioning of the indicator 5 over the selected point in the scale 6 must be done by sight, quickly and a decided margin of error usually results.

My metering device consists of a plate or housing 9 which is bolted to the side of the dispenser 1 in any convenient manner and which normally houses the gears and rotating shaft. Within the housing, I provide a radially projecting arm 10 which is keyed to the shaft 3 and held in position by the nut 4. The arm 10 carries a projecting finger 11 which is preferably formed of resilient material and which terminates in a hook-like projection 12.

I preferably mount the finger 11 on a stiff projection portion 13 of the arm 10 by means of a bolt 14 so that it may readily be replaced.

The surface of the projection 13 is beveled as at 15 and backs up the fingers 11 so as to limit the resilient movement or give of the finger 11.

Since the arm 10 is keyed to the shaft 3, the rotation of the shaft 3 moves the end 12 of the finger 11 through an arcuate path and the degree of rotation of the shaft 3 equals the degree of rotation of the arm 10 and finger 11, which in turn meters the tape being dispensed.

My housing 9 is so constructed as to provide an arcuate track 16 just outside of the arcuate path of the finger end 12.

Positioned in the track 16, I provide a series of depressible pins 17 which are mounted in holes 18 in the path 16 and positioned along the path 16 at predetermined points so that when they are projected into the path of the finger 11, they will stop the movement of the finger 11 and hence the shaft 3 at a predetermined degree of rotation. The pins 17 are terminated by indicia 18 indicating the length of tape to be dispensed.

The pins 17 themselves are preferably terminated by a cap 19 with a downwardly projecting sleeve 20 which encloses a helical spring 21 which surrounds the pins 17. The pins 17 have a cut out slot 22 in their sides and are held in position in the track 16 by a removable strip of metal 23 mounted in the casting 9 which project in the slots 22 and hold the pin 17 in position, but permit its longitudinal movement of a limited extent.

The pin 17 carries a slot 24 within which is pintled a latch 25 having a projecting hook 26 which is urged out of the slot 24 by a bend spring 27 which abuts the termination of the slot 24 and an upper surface of the latch 25. The spring 27 is maintained in position by a short projection 28 which is inserted in a small hole in the latch 25, as is clearly shown in Figures 8, 9, and 10.

Figure 8:
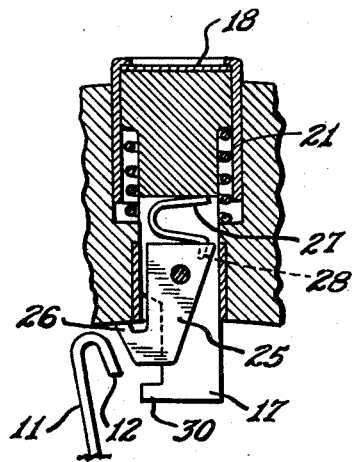
Figure 8 is a cross section of a typical key or button mounted in my metering device and in operative or abutting position.
Figure 9:
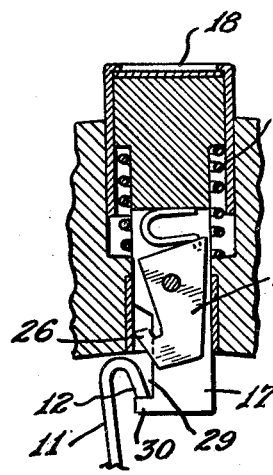
Figure 9 is a cross section similar to that shown in Figure 8 with the abutment in contact with the key.
Figure 10:
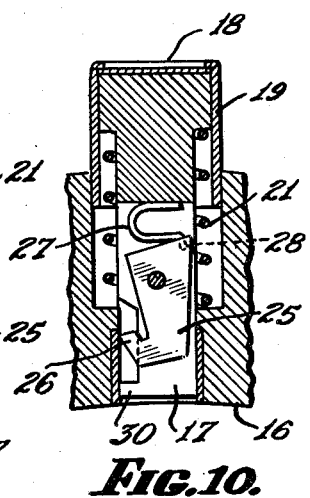
Figure 10 is a cross section similar to that shown in Figure 8 with the key or button retracted and out of abutting position.

Referring to Figures 8, 9, and 10, it is apparent that when the button or key 18 is depressed, the pin 17 is projected downwardly through the track 16 and into the path of the finger 11, and the hook end 26 of the latch 25 is forced outwardly by the spring 27 and latches or locks the pin 17 in its downward position within the path of the finger 11 as is shown in Figure 8.

When the dispenser is operated and the finger 11 rotated until it contacts the pin 17 which stops the rotation of the shaft 3, it should be noted that the projecting end 12 of the finger 11 contacts the projection 26 of the latch and forces it inwardly as shown in Figure 9. This permits the pin 17 to slide out of its position in the path of the finger 11. However, the pin 17 has a long notch 29 which terminates in a shoulder 30. After the projection 12 on the finger 11 releases the latch 25, it catches on the shoulder 30 of the pin 17 and prevents its removal under the action of the spring 21 from the path of the finger 11 as shown in Figure 9. When the shaft 3 is reversed, thus removing the finger 11 from its contact with the pin 17, the pin 17 under the force of the spring 21 snaps upward and out of its position within the path of the finger 11 as shown in Figure 10.

The above construction of the pin 17 insures that the finger 11 is stopped and eliminates the possibility of the finger throwing the latch and then passing on beyond the pin 17. This construction also insures the retraction of the pin each time it is contacted by the finger 11. In the event the handle 2 is operated with excess force, the resiliency of the finger 11 cushions the stop, while the backing 13 limits the rearward movement of the finger 11 and prevents it from bending to an extent where it might break or pass over the projecting pin 17. In the event the finger 11 should become worn or bent, it may be easily replaced by merely removing the bolt 14 and replacing with a new finger.

If the operator wishes to dispense a great number of strips of the same length or of any length between two adjacent buttons, I provide the pointer 5 which rides over the tops 18 of the buttons or keys. The pointer 5 has a shaft portion 5' which fits over the shaft end 3 below the nut 4 and is held in its correct position by means of a small tongue which projects into the aperture 31 of the arm 10. The end of the pointer 5 at 5'' is bent downwardly and rides over the scale 6. The scale 6 is divided into units such as fractions of an inch and, when desirable, the handle 2 may be rotated until the pointer 5' is opposite the length desired to be dispensed. Then the end nut 7 is loosened and moved up on the track 8 so as to form an abutment for the handle 2. Thus, a great many strips may be dispensed of the same length without the necessity of depressing any of the buttons 18.

While my metering device as shown and described is primarily for use with a hand operated tape dispenser, it may also be used with an electric motor driven tape dispenser, where the stopping of the rotation of the shaft 3 and its angular position determines the length of tape which is dispensed.

From the above, it is apparent that I have provided a metering device for tape dispensers which may be easily and readily attached to many types of dispensers and which permits the dispensing of different lengths of tape speedily and in a positive manner at will. Since the length of tape is exactly metered and it is not necessary as with ordinary machines for the operator to rely on his vision or ability to stop quickly at a given point each time he dispenses a length of tape, my device speeds such dispensing and saves a great deal of tape which otherwise would be wasted.

My device is relatively inexpensive to manufacture and sell and any necessary repairs are extremely simple, when necessary.

It is to be understood that modification may be made in my invention without departing from the spirit thereof, and I do not intend to limit myself otherwise than as pointed out in the claims which follow.

Having thus described my invention, what I claim as new and desire to secure by Letters Patent is:

1. In a tape dispenser of the class wherein a shaft is rotated to dispense the tape in a length proportional to the degree of rotation, tape metering means comprising a radially projecting arm immovably mounted on the shaft and terminating in an abutment which sweeps in a curved path upon rotation of the shaft, at least one stop removably positioned within the path of said abutment at a predetermined degree of rotation of the shaft to stop the rotation of the shaft and meter the tape dispensed, said stop comprising a pin manually depressible into said path, a latch for holding the said pin in the depressed condition, and means on said abutment for releasing said latch and permitting said pin to leave said path after the rotation of the shaft has been stopped.

2. In a tape dispenser of the class wherein a shaft is rotated to dispense the tape in a length proportional to the degree of rotation, tape metering means comprising a radially projecting arm immovably mounted on the shaft and terminating in an abutment which sweeps through a curved path upon rotation of the shaft, at least one stop removably positioned within the path of said abutment at a predetermined degree of rotation of the shaft to stop the rotation of the shaft and meter the tape dispensed, said stop comprising a pin manually depressible into said path, a latch for holding the said pin in the depressed condition, and means on said abutment for releasing said latch and permitting said pin to leave said path after the rotation of the shaft has been stopped, and a projection on said abutment and a notch in said pin mutually engageable for holding said pin in said path after said latch is released and until the movement of said arm is reversed.

3. In a tape dispenser of the class wherein a shaft is rotated to dispense the tape in a length proportional to the degree of rotation, tape metering means comprising a radially projecting arm immovably mounted on the shaft and terminating in an abutment which sweeps in a curved path upon rotation of the shaft, a plurality of stops manually movable into the path of said abutment and positioned at predetermined degrees of rotation of the shaft to stop the rotation of the shaft at predetermined angles of rotation thus metering the tape dispensed, said stops comprising a plurality of buttons selectively depressible to lie in the path of said abutment, means on said buttons for maintaining them in the depressed condition, and means on said abutment for releasing said buttons from the depressed position.

4. Means for selectively stopping the movement of an abutment in a continuous path comprising pins positioned at predetermined intervals along said path and manually depressible into said path, latch means for holding said pins in the said path, and means on said abutment for releasing said latch means upon contact with a pin, a projection on said abutment and a notch in each of said pins mutually engageable for holding said pins in said path after said latch means is released and until the movement of the abutment is reversed.

5. In a tape dispenser of the class wherein a shaft is rotated to dispense the tape in a length proportional to the degree of rotation, tape metering means comprising a radially projecting arm immovably mounted on the shaft and terminating in a resilient metallic finger which sweeps in a curved path upon rotation of the shaft, at least one stop removably positioned within the path of said finger at a predetermined degree of rotation of the shaft to stop the forward movement of said arm and the rotation of the shaft and thereby meter the tape dispensed, said finger making resilient contact with said stop during forward movement thereof.

6. In a tape dispenser of the class wherein a shaft is rotated to dispense the tape in a length proportional to the degree of rotation, tape metering means comprising a radially projecting arm immovably mounted on the shaft and carrying a removable resilient finger terminating in a projection which sweeps through a curved path upon rotation of the shaft, at least one stop removably positioned within the path of said finger at a predetermined degree of rotation of the shaft to stop the rotation of the shaft by contact with said finger and meter the tape dispensed, said stop comprising a pin manually depressible into said path, a latch for holding said pin in the depressed condition, said latch being adapted to be released upon contact with said finger end, a notch in said pin adapted to be entered by the projection on said finger to hold the pin in said path after said latch is released and until the movement of said arm is reversed.

7. In a tape dispenser of the class wherein a shaft is rotated to dispense the tape in a length proportional to the degree of rotation, tape metering means comprising a radially projecting arm immovably mounted on the shaft and carrying a removable resilient finger terminating in a projecetion which sweeps through a curved path upon rotation of the shaft, at least one stop removably positioned within the path of said finger at a predetermined degree of rotation of the shaft to stop the rotation of the shaft by contact with said finger and meter the tape dispensed, said stop comprising a pin manually depressible into said path, a latch for holding said pin in the depressed condition, said latch being adapted to be released upon contact with said finger end, a notch in said pin adapted to be entered by the projection on said finger to hold the pin in said path after said latch is released and until the movement of said arm is reversed, said projecting arm being relatively stiff and having a portion positioned behind said resilient finger and spaced therefrom to limit the bend of said finger.

8. In a tape dispenser of the class wherein a shaft is rotated to dispense the tape in a length proportional to the degree of rotation, tape metering means comprising a radially projecting arm immovably mounted on the shaft and terminating in a finger which sweeps in a curved path upon rotation of the shaft, a plurality of depressible pins positioned along the path of said finger, said pins, when depressed, extending into the path of said finger at predetermined degrees of rotation of the shaft to stop the rotation of the shaft and meter the tape dispensed, said pin terminating upwardly in buttons marked with indicia indicating the length of tape which will be dispensed upon the depressing of a given button, and an indicating arm immovably mounted on said shaft and having a portion overriding said buttons to indicate the angular movement of said shaft.

9. The device claimed in claim 8 including a scale adjacent said buttons and positioned adjacent the path of said indicating arm to indicate the angular movement of said shaft.

10. Tape metering means for a tape dispenser of the class wherein a shaft is rotated to dispense the tape in a length proportional to the degree of rotation of the shaft, said means comprising a radially projecting arm fixed to the shaft, a resilient finger on said arm which sweeps in a curved path upon rotation of the shaft, means for selectively stopping the movement of said finger at predetermined intervals along said path, said means comprising pins positioned at predetermined intervals along said path and manually depressible into said path, latch means for holding said pins in said path, and means on said finger for releasing said latch means upon contact with a pin, a projection on said finger and a notch in said pin mutually engageable for holding said pin in said path after said latch is released and until the movement of said finger is reversed.

AUGUST C. HUMMEL.

References Cited in the file of this patent

UNITED STATES PATENTS

| Number | Name | Date |
|---|---|---|
| 812,723 | Caldwell et al. | Feb. 13, 1906 |
| 1,080,913 | Joline | Dec. 9, 1913 |
| 1,250,790 | Brownson | Dec. 18, 1917 |
| 1,432,616 | Phinney | Oct. 17, 1922 |
| 1,782,123 | Krueger | Nov. 18, 1930 |
| 1,921,625 | Link | Aug. 8, 1933 |
| 2,066,617 | Gautier | Jan. 5, 1937 |
| 2,066,618 | Gautier | Jan. 5, 1937 |
| 2,176,640 | Payne | Oct. 17, 1939 |
| 2,472,340 | Prezioso | June 7, 1949 |
| 2,519,701 | Richardson | Aug. 22, 1950 |